Jan. 29, 1963     S. L. BURGWIN     3,076,111

MAGNETIC TORQUER

Filed June 25, 1956

INVENTOR.
STEPHEN L. BURGWIN

BY Joseph E. Ryan

ATTORNEY

United States Patent Office 3,076,111
Patented Jan. 29, 1963

3,076,111
MAGNETIC TORQUER
Stephen L. Burgwin, White Bear Lake, Minn., assignor to Minneapolis-Honeywell Regulator Company, Minneapolis, Minn., a corporation of Delaware
Filed June 25, 1956, Ser. No. 593,568
4 Claims. (Cl. 310—266)

The novel device disclosed is an electromagnetic torquer and more specifically is a torquing device in which a magnet is utilized as a fixed core member in conjunction with a fixed stator structure cooperating with an energizable coil to yield the desired output.

Electromagnetic torquers have long been used as an important element in control systems, and in particular systems which utilize gyroscopes for a sensing or control element. In most gyroscope applications the torquing device consists of a magnetic structure which utilizes two separate electrical circuits to generate the necessary restoring torque. This type of an arrangement may be undesirable because of the cost, the linearity, or the weight. With these problems in mind the present device was conceived.

It is the primary object of this invention to provide a magnetic torque generating device which has a highly linear current versus torque characteristic.

It is a further object to disclose a torque generator which has a low residual torque.

Still a further object is to disclose a torque generator which is shielded from stray external magnetic fields and is in turn capable of production of practically no stray external fields itself.

Figure 1:
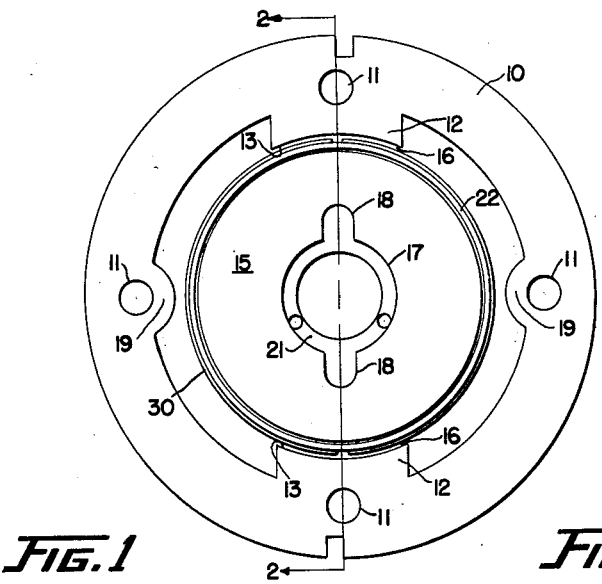
Figure 2:
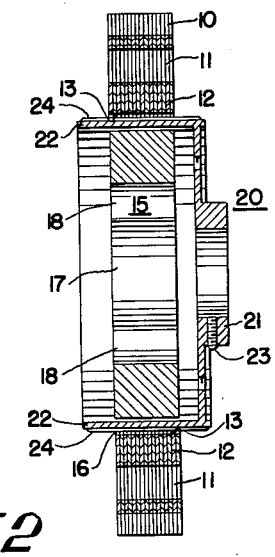
Figure 4:
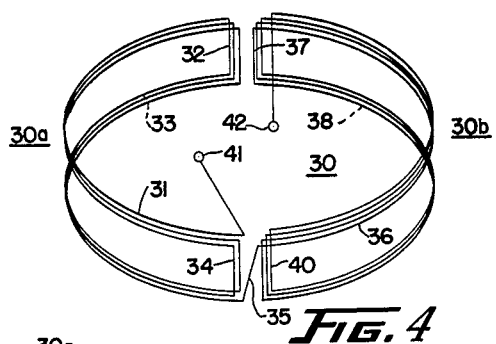
Figure 3:
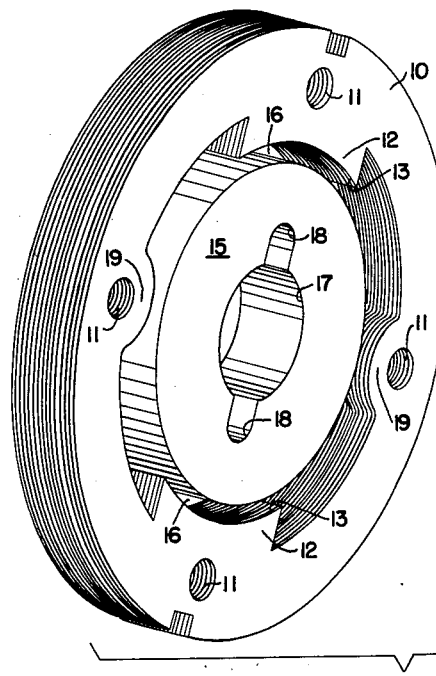
Figure 3:
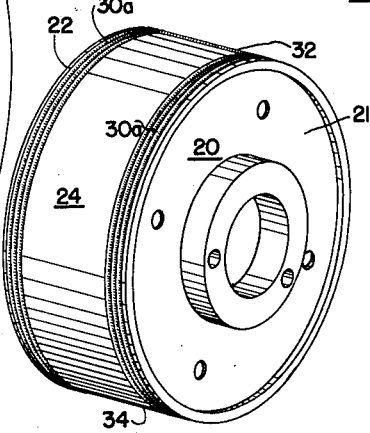

These and other objects will become apparent when the following specification is considered with the single sheet of drawings wherein:

FIGURE 1 is an elevation of the torquer;
FIGURE 2 is a cross-sectional along lines 2—2 of FIGURE 1;
FIGURE 3 is an exploded view of the device; and
FIGURE 4 is a schematic representation of the energizing coil of the device.

An annular stator structure 10 is formed of a plurality of individual, identical laminations which are bonded or held together in any convenient manner. The stator 10 has four mounting holes 11 which are utilized to support the stator on any convenient structure (not shown) and also can be utilized to lock the laminations together. Projections 19, as their sole function, maintain a constant cross section in stator 10 around holes 11. The stator 10 further has two pole projections 12 which project inwardly and have pole faces 13 which are curved to conform to the radius of the stator structure 10.

Mounted within the stator 10 is a permanent magnet 15 which is circular in shape and defines an annular air gap 16 with the pole faces 13 of the stator structure 10. The permanent magnet 15 has an opening 17 in its center and this opening is substantially circular. At diametrically opposite points in the periphery of the opening 17 are two detents 18 which are provided for mounting the permanent magnet 15 to a structure, such as that to which stator 10 is mounted. The detents 18 are aligned with the poles 12 of the stator 10 and the permanent magnet 15 is magnetized such that the north and south poles of the magnet correspond with the detents 18. The detents 18 and opening 17 are of such a size and shape that the shortest magnetic path through magnet 15 from every point on one pole 12 to the same point on the other pole 12 is substantially constant. It will be apparent from this arrangement that a strong magnetic field will be established across the air gap 16 from the permanent magnet 15 and will return through the stator 10 via poles 12.

Inserted in the air gap 16 is a cup 20 of non-magnetic material. The cup 20 is formed having a hub 21 and a rim 22. The cup 20 is supported in the air gap 16 in such a manner that it is free to rotate with the rim 22 always centered in the air gap. In a typical mounting arrangement for cup 20 the hub 21 would be attached to a shaft (not shown) by means of a set screw 23 which is threaded into the side of the hub 21.

The rim 22 has a center raised portion 24 which forms an integral part of the rim 22 and is utilized to hold a winding 30 in place. The winding 30, which will be explained in detail below, can best be seen on the cup 20 in FIGURE 3 and is disclosed in a schematic form in FIGURE 4. The exact nature of the winding configuration of winding 30 can best be understood by considering the individual turns as disclosed in FIGURE 4. The winding 30 is formed having a plurality of turns resulting in coils 30a and 30b. A typical sequence in forming the coil 30a is shown by following from wire 31 to 32 to 33 and then to 34. This pattern is repeated until the desired number of turns is applied. After the last turn has been applied to coil 30a the wire is crossed over at 35 to the other side of the rim 22. A sequence for coil 30b is then established from 36 to 37 to 38 and then to 40. The ends of the winding 30 are then brought out to terminals 41 and 42 to be energized in a manner which will be described below. The term coil as used herein forms a part of the entire winding 30. A careful consideration of the layout of either coil 30a or 30b will disclose portions of turns which are concentric with the cup rim 22 such as portions 31, 33, 36 and 38, and other portions parallel with its rotational axis such as portions 32, 34, 35, 37 and 40.

It should be noted that a second method of forming the winding, that is in addition to forming it directly on the cup, could be utilized. The winding 30 could be preformed in the configuration shown in FIGURE 4 on a removable form. The turns of the winding after being put in place could be impregnated with a varnish or similar material to hold them in a rigid relationship with one another. Then the form supporting the winding 30 could be removed and a cup similar to cup 20 could be cast directly into the winding. Whether the turns are placed directly on a preformed cup 20 or whether the cup 20 is cast into the winding 30 is a matter of choice depending on the size and circumstances involved in the fabrication of the device.

Upon assembling the cup 20 into the air gap 16 the wire portions 32 and 37 are placed adjacent the center of one pole piece 12 while the wire portions 34, 35 and 40 are placed adjacent the center of the opposite pole piece 12. Assembly of the device in this fashion can best be seen in FIGURE 3 and the coils 30a and 30b can be considered to be additively connected. It will be noted that upon energization of terminals 41 and 42 of winding 30 that the current flows in the same direction in portions 32 and 37 and that this current flow is opposite to the direction of current flow in portions 34, 35 and 40. With this arrangement it will become apparent that the reaction of the flux in the air gap 16 with portions 32 and 37, and with portions 34, 35 and 40 will be such as to provide a torque tending to rotate the cup about the axis of the hub 21 in one direction or the other relative to the poles 12. By reversing the energization of terminals 41 and 42 the direction of rotation of the cup is also reversed.

Due to the low reluctance of the stator 10 and the small air gaps 16, almost all of the flux emanating from the permanent magnet 15 passes around a closed magnetic circuit formed by these components. There is a very small amount of leakage flux present and this flux reacts with the current in winding 30 to produce a slight force which does not, however, react around the rotational axis of the cup 20. This force is small, and it can be disregarded as having any adverse effect upon the operation of the device, since this force is normal to the usual axis of rotation and therefore produces no error or adverse effects on the linearity of operation of the torquer.

Because the stator 10 has a low reluctance and completely encircles the device, stray magnetic fields are effectively shielded from the device and other devices neither effect or are effected by this novel permanent magnet torquer. This unit has proven to be very linear in regards to its torque versus current characteristics and has a very low residual torque.

With the arrangement disclosed it becomes obvious that a torque generating device is produced which is exceedingly compact in design and efficient in operation. The application of this type of torque generating unit to such devices as gyroscopes would be apparent to those skilled in the art and many modifications of the teachings described herein would also become obvious. It should be kept in mind that the present disclosure is intended to be illustrative only and that the disclosure was of a single preferred embodiment. Consequently, the subject invention should be limited only by the appended claims.

I claim as my invention:

1. A torque generator comprising a multi-pole permanent magnet symmetrical about a central axis, said poles being radially disposed about said axis, a ring of magnetic material spaced from and concentric with said magnet, a sleeve of non-magnetic material disposed between said magnet and ring and concentric therewith, a plurality of generally rectangular series-connected coils attached to and conforming with the outer surface of said sleeve, said coils being equally spaced about said sleeve, each said coil being so disposed that each pair of adjacent coil sides parallel to said axis is substantially centered over a pole of said magnet, means for mounting said sleeve for limited rotation such that each pair of adjacent coil sides remains at all times substantially centered over its associated magnet pole, means for conducting electrical currents through said coils and means for transmitting torque from said sleeve.

2. A torque generator comprising a multi-pole permanent magnet symmetrical about a central axis, said poles being radially disposed about said axis, a ring of magnetic material spaced from and concentric with said magnet, a sleeve of non-magnetic material disposed between said magnet and ring and concentric therewith, a plurality of generally rectangular series-connected coils carried by said sleeve and conforming with the outer surface of said sleeve, said coils being equally spaced about said sleeve, each said coil being so disposed that each pair of adjacent coils sides parallel to said axis is substantially centered over a pole of said magnet, means for mounting said sleeve for limited rotation such that each pair of adjacent coil sides remains at all times substantially centered over its associated magnet pole, means for conducting electrical currents through said coils and means for transmitting torque from said sleeve.

3. A torque generator comprising a multi-pole permanent magnet member symmetrical about a central axis, said poles being radially disposed about said axis; a ring member of magnetic material spaced from and concentric with said magnet member, one of said members having a plurality of radially projecting pole portions; a sleeve of non-magnetic material disposed between said members and concentric therewith; a plurality of generally rectangular series-connecting coils carried by said sleeve and conforming with the outer surface of said sleeve, said coils being equally spaced about said sleeve, and each said coil being so disposed that each pair of adjacent coil sides parallel to said axis is substantially centered over a pole portion; means for mounting said sleeve for limited rotation such that each pair of adjacent coil sides remains at all times substantially centered over its associated pole portion; means for conducting electrical currents through said coils; and means for transmitting torque from said sleeve.

4. A torque generator comprising a multi-pole permanent magnet member symmetrical about a central axis, said poles being radially disposed about said axis; a second member of magnetic material, spaced from and concentric with said magnet member, one of said members being ring shaped and one of said members having a plurality of radially projecting pole portions; a sleeve of non-magnetic material disposed between said members and concentric therewith; a plurality of generally rectangular coils carried by said sleeve and conforming with the outer surface of said sleeve, said coils being so disposed that each pair of adjacent coils sides parallel to said axis is substantially centered over a pole portion; means for mounting said sleeve for limited rotation such that each pair of adjacent coil sides remains at all times substantially centered over its associated pole portion; means for conducting electrical currents through said coils; and means for transmitting torque from said sleeve.

References Cited in the file of this patent

UNITED STATES PATENTS

| 377,683 | Mather | Feb. 7, 1888 |
| 1,181,270 | Varley | May 2, 1916 |
| 2,779,882 | Kazuo Ishikawa | Jan. 29, 1957 |
| 2,860,267 | Hayes | Nov. 11, 1958 |

FOREIGN PATENTS

| 827,986 | Germany | Jan. 14, 1952 |
| 894,422 | France | Dec. 22, 1944 |